June 18, 1935.  E. V. HIGBEE  2,005,677
COILABLE MEASURING RULE
Filed Feb. 8, 1933
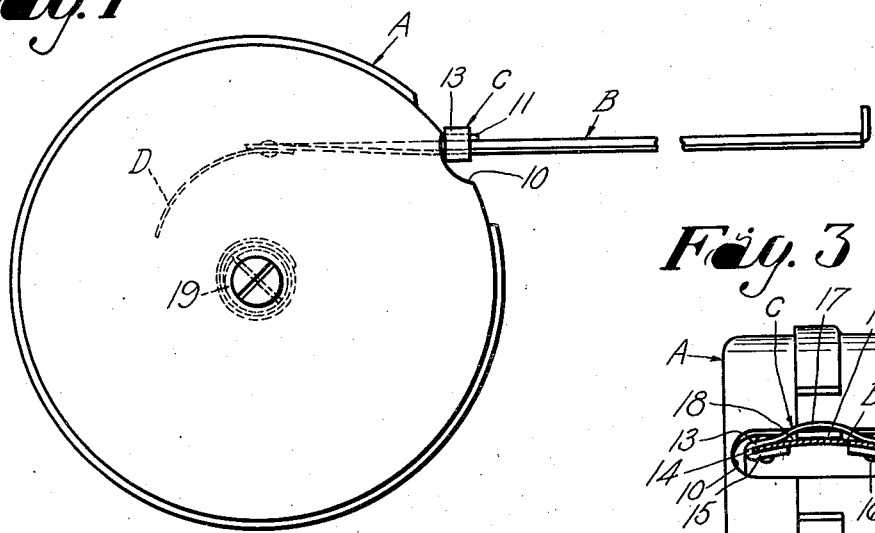
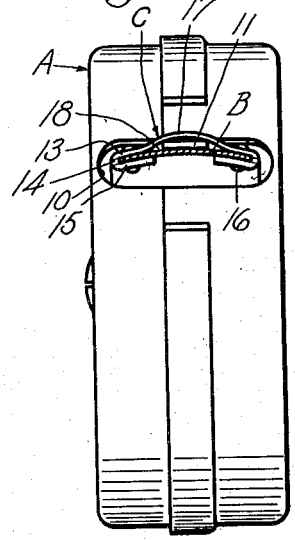
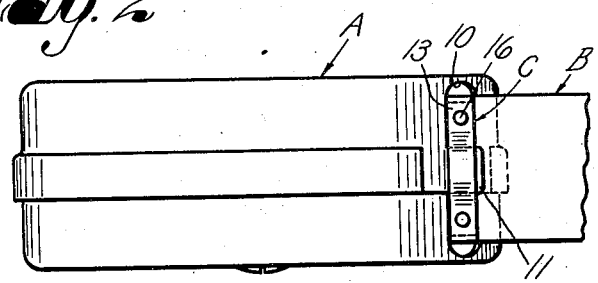
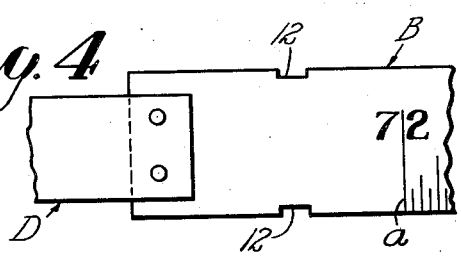
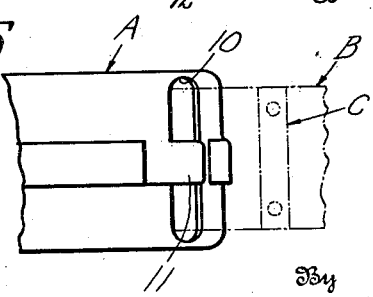
Inventor
Earl V. Higbee
By
Attorney Patented June 18, 1935

2,005,677

UNITED STATES PATENT OFFICE 2,005,677

COILABLE MEASURING RULE

Earl V. Higbee, New Britain, Conn., assignor to The Stanley Works, New Britain, Conn., a corporation of Connecticut Application February 8, 1933, Serial No. 655,695

3 Claims. (Cl. 33—138)

The present invention relates to measuring devices of the type which includes a steel measuring tape adapted to be coiled within a suitable holder or casing, and is more particularly concerned with the provision of an improved means for preventing the accidental or inadvertent winding up of the measuring tape when it has been withdrawn from the casing or holder to its maximum measuring position. While the improvements of the present invention may be applied to measuring tapes of any character, they find particular application in connection with a measuring tape having a bent transverse form, such as a concavo-convex form, so that the tape has an inherent tendency to assume a rectilinear state.

It is an object of the present invention to provide an improved locking means for preventing the accidental winding up of the measuring tape within the holder after the tape has been fully extended. With this thought in mind, cooperating parts are provided on the casing and measuring tape, respectively, which become effective when the tape is in its fully withdrawn measuring position to hold the tape in said position.

It is another object of the present invention to provide an improved device of this character comprising relatively few parts, which is of simple construction, is cheap to manufacture, and which is sure and effective in operation.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one embodiment which the present invention may take, Fig. 1 is a side view of a measuring device in which the improvements of the present invention are incorporated and showing the measuring tape locked in its fully withdrawn measuring position;

Fig. 2 is a top plan view of what is shown in Fig. 1;

Fig. 3 is an edge view of what is shown in Fig. 1 with the measuring tape in cross section;

Fig. 4 is an enlarged fragmentary view of the inner end of the measuring tape; and Fig. 5 is a fragmentary top plan view of the device, showing the parts in unlocked position.

Referring more particularly to the drawing, A generally indicates a casing or holder of the usual construction and into and out of which a measuring tape B is adapted to be wound and unwound, and C generally indicates my improved locking means between the casing A and tape B by means of which the tape B is held in withdrawn position, and D indicates a winding means for withdrawing the tape B into the casing A. The casing A is provided with the usual opening or slot 10 in its peripheral wall and through which the tape B is adapted to be moved into and out of the holder A.

The measuring tape B may be a six foot rule with the seventy-two inch scale marking disposed adjacent its inner end as indicated at $a$ and may comprise a strip of resilient metal having a concavo-convex form so that, when extended, it will automatically assume a rectilinear state or straight rod-like form. The tendency of this tape is to unwind, that is, to resist bending. In measuring devices of this character, the winding means may be such as to approximately balance the resistance of friction and the tendency of the measuring tape to resist bending, or it may have sufficient tension to overcome the resistance of friction and the resistance of the measuring tape to bend. In the present instance, the winding means D may be of the former type and may be secured within the casing A, as at 19, in the usual manner.

In order to prevent the accidental rewinding of the tape B within the casing A, the locking means C is provided. The locking means C comprises a tongue or lug 11 which may be formed integral with the casing A adjacent the slot therein. Adjacent its inner end and inwardly of the scale marking $a$, the measuring tape B has its opposite side edges provided with alined notches 12. A strip of metal, or other suitable material, 13 having bent over portions 14 and attaching lugs 15 at its free ends is adapted to be secured to the tape B adjacent the inner end thereof. The strip 13 may be secured to the tape B by placing the strip 13 upon one face of the tape B in line with the notches 12 thereof and bending the opposite end portions of the strip 13 downwardly and then upwardly so that the bent over portions 14 are received by the notches in the strip B, and the attaching lugs 15 are disposed in engagement with the other face of the tape B. The strip 13 may then be secured to the tape B by means of rivets 16 or the like which pass through the main portion of the strip 13, the tape B and the lugs 15 of the strip 13. It is noted, especially from Fig. 3, that the intermediate portion of the strip 13 is bowed upwardly, as at 17, so as to provide a space or socket 18 between the adjacent faces of the tape B and the strip 13. This socket 18 is adapted to receive the tongue 11 of the holder A when the tape B has been substantially fully withdrawn from the casing A and it is desired to maintain the tape B in its fully withdrawn measuring position.

In the use of the device, the tape B may be withdrawn from the casing A until the strip 13 is moved to a position outwardly of the tongue 11. Due to the energy stored up by the winding means D by the act of withdrawing the tape B from the casing and on account of the tendency of the tape B to resist bending, when the tape B is released the latter will be automatically moved into the casing and the socket 18 will be moved into a position in which it will receive the tongue 11. The tendency of the winding means to withdraw the tape B into the casing and the inherent resistance possessed by the tape B to bending will maintain a sure and effective interlock between the tongue and socket. It is thus apparent that a positive locking means, which is sure and effective in operation, is provided for maintaining the measuring tape B in its fully withdrawn measuring position. When it is desired to rewind the tape B into the casing A, it is merely necessary for the user of the device to grasp the tape B adjacent the locking means C and withdraw the tape B slightly further from the casing A until the socket 18 is free of the tongue 11 and then move the socket 18 out of line with the tongue 11 and hold the same in that position until the strip 13 and socket 18 have passed into the casing A.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a casing having an entrance slot and a tongue adjacent said slot, a measuring tape adapted to be coiled within said casing and to pass through said slot, said tape being so formed as to normally spring outwardly toward said tongue, winding means within the casing for coiling said tape, and an element secured to said tape and having a portion spaced from said tape, whereby a socket is provided which is adapted to be automatically moved by said tape to a position in which it receives said tongue to prevent movement of the tape into the casing.

2. In combination, a casing provided with an entrance slot having a rear edge and a tongue on said rear edge, a measuring tape adapted to be coiled within said casing and to pass through said slot, winding means within said casing for coiling said tape, said tape having a concavo-convex form, whereby it normally springs towards the rear edge of said slot, and an element secured to the convex surface of said tape and having a portion spaced therefrom to provide a socket which is automatically moved by said tape into engagement with said tongue to prevent movement of the tape into the casing.

3. In combination, a casing having an entrance slot and a tongue adjacent said slot, a measuring tape adapted to be moved into, and out of, said casing through said slot, and having its opposed side edges provided with notches adjacent the inner end thereof, and a strip secured to said tape and having bent over portions received by said notches, said strip also having an intermediate outwardly bowed portion, whereby a tongue receiving socket is formed by said tape and said bowed portion.

EARL V. HIGBEE.